June 8, 1965 D. DINELLI ETAL 3,187,486
PROCESS AND DEVICE FOR BIDIMENSIONAL GAS
CHROMATOGRAPHY FOR PREPARATIVE PURPOSES
Filed March 14, 1961 3 Sheets-Sheet 3

INVENTOR
DINO DINELLI,
MARCO TARAMASSO,
STEFANO POLEZZO

BY
ATTORNEY

United States Patent Office 3,187,486
Patented June 8, 1965

3,187,486
PROCESS AND DEVICE FOR BIDIMENSIONAL GAS CHROMATOGRAPHY FOR PREPARATIVE PURPOSES
Dino Dinelli and Marco Taramasso, San Donato Milanese, and Stefano Polezzo, Milan, Italy, assignors to Laboratori Riuniti Studi E Ricerche S.p.A., San Donato Milanese, Italy, a company of Italy
Filed Mar. 14, 1961, Ser. No. 95,706
3 Claims. (Cl. 55—67)

Gas chromatography is a known process for the separation of a mixture of vaporizable liquids or of gases into its components based on partition of the components among a gaseous mobile phase called also the carrier gas, and a liquid stationary phase, or among a gaseous mobile phase and a solid stationary phase.

There are known laboratory devices which permit the separation of the constituents of a sample by gas chromatography for the preparation of pure compounds, said devices being manually actuated, or provided with time programming devices.

In practice the stationary phase can consist of an adsorption material, or of an inert carrier, which has been impregnated with a fluid acting as a solvent. If the movable gas phase, consisting of a carrier gas and the gas mixture injected into this, is passed over the stationary phase, then a separation of the mixture into the individual components is effected.

In practice during the whole of the separation operation a carrier gas is passed through a column filled with the stationary phase. In this way, the foreign gases, which are present in the column, are first flushed out. After the foreign gases have been removed, a small amount of the mixture, which is to be analyzed, is injected into the stream of the carrier gas. Because of the different partition of the components of the gas mixture between the movable, gaseous phase and the fixed, solid, stationary phase, the individual components pass through the column with different velocities. At first only carrier gas appears at the discharge end of the column; but after a definite period of time, the first component of the mixture appears together with the carrier gas, this first component being that which passes through the column the quickest. After periods of time, characteristic for the individual gas components, and alternating with the carrier gas, the other components of the mixture appear.

Continuous processes for the above purposes, are known, based on the counter-current movement along one and the same direction of both the stationary phase and the carrier gas (R. T. W. Scott, page 287 of "Gas Chromatography," 1958, edited by D. H. Desty, Butterworth's Scientific Publications, London 1958).

It is an object of the present invention to provide a process particularly for the preparation of pure compounds on a laboratory scale of bi-dimensional gas chromatography as well as a device adapted for carrying out the process.

According to the present invention, the separation of a mixture of gases or of liquids in the vapour phase into its components is obtained through the movement of the stationary phase in a different direction, preferably normal to the direction of the movement of the carrier gas, the angle between the two vectors representing the movement having any value greater than 0° and less than 180°, and the mass of the stationary phase being divided in such a way as to determine a plurality of passageways or separate channels for the carrier gas, said channels being arranged in parallel and having small transverse dimensions. The channels may be rectilinear and substantially parallel to the direction of movement of the carrier gas; or they may be inclined with respect to that direction or more specifically have a helical course.

As a consequence of the diversity of the directions of movement of the two phases, the separation of the components is effected in a space having a considerable overall cross-section, which permits treating easily even considerable amounts of material. Moreover the division of the stationary phase into a plurality of channels for the gas prevents the lateral diffusion that would instead take place if there were no divisions.

Figure 1:
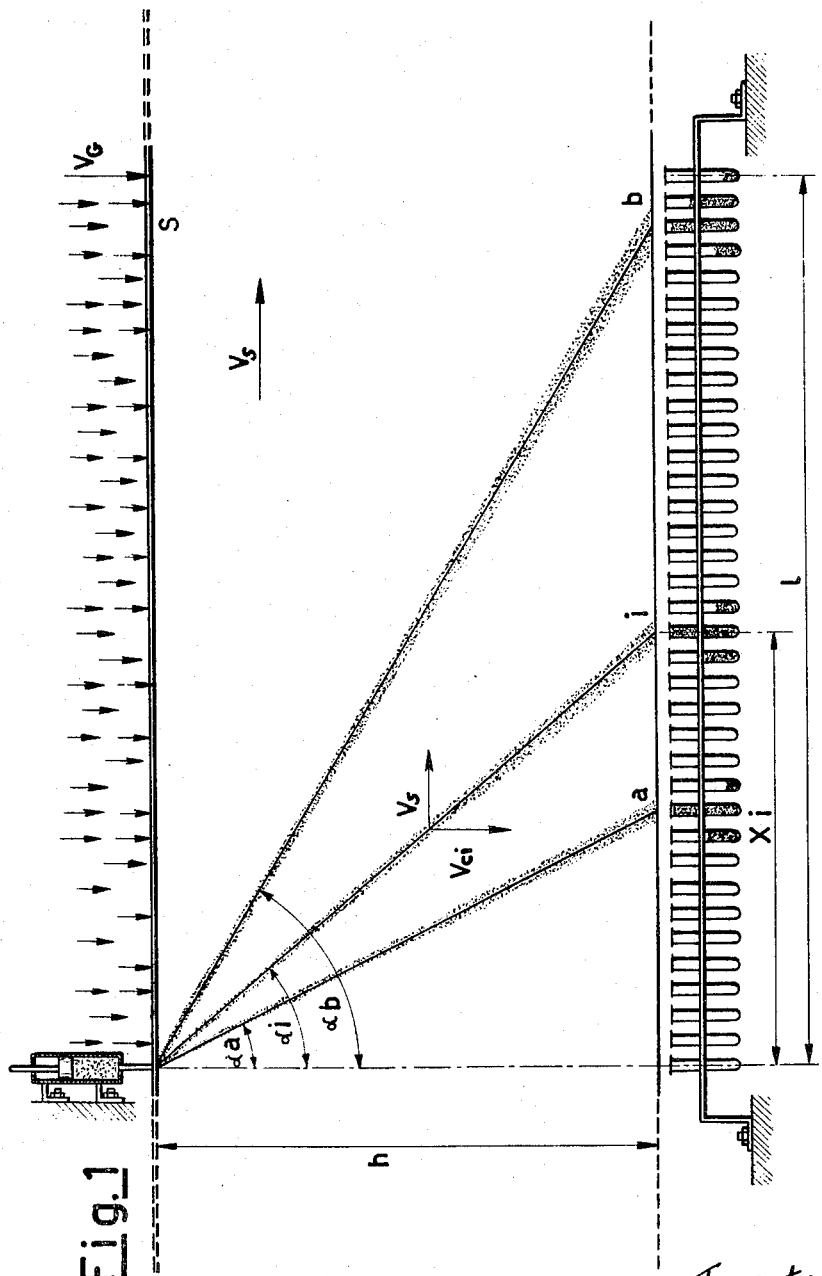
FIG. 1 is a diagram illustrating the principle upon which the process of the present invention is based.

The fundamental principle upon which the process of the present invention is based, is made clear in the diagram of FIGURE 1. The stationary phase (S), here constituted by a thin film of separating liquid or by a thin layer of adsorbent solid, having height $h$ and indefinite length $l$, moves with speed $V_S$ in the direction indicated by the corresponding arrow. The mobile phase or carrier gas flows with laminar motion in a direction normal to that of the stationary phase as denoted by arrows $V_G$ in the upper part of FIG. 1. The system for feeding the mixture to be separated in the vapour state, which is indicated in the figure symbolically by the piston A, and the collecting system, which is represented by the series of test tubes, are fixed, that is to say they do not take part in the movement.

Obviously the result is identical if the stationary phase is fixed and concurrently the feeding and collecting systems move. A mixture of components injected at the point A, will undergo along the vertical $h$, the usual chromatographic separation, since each component displaces itself by a speed of its own which is a function of its time of retention by the mixture.

On the other hand the stationary phase shifts with its own speed in a direction normal to the preceding one. Since it is subdivided into channels of small cross-section, and, therefore, a free lateral diffusion of the components in the mass of the stationary phase is prevented, the speed of translatory movement of the stationary phase is transmitted substantially unaltered to each portion of the components.

Moreover, owing to the simultaneous movement of the stationary phase, the motion of each component will result from the combination of the two movements; and the separation of the mixture will take place along oblique bands whose trajectories form different angles with the vertical. Hence the elution of each component will take place in a distinct zone along the lower border of the stationary phase and determined by the speed of the said stationary phase and by the time of retention of the component considered.

The principle described may be conveniently carried out by arranging the stationary phase in an annulus and rotating the annulus about its axis while the carrier gas flows into said annulus in a direction parallel to said axis.

Of course the selection of the optimum speed of rotation is a function of the times of retention, of the speed of the carrier gas, and of the height of the cylinders. The stationary phase is divided by providing a plurality of separate channels of small cross-section, which may be parallel to the axis of the annulus, or which may be arranged helically thereabout.

In this latter case the angle between the vectors representing the motion of the carrier gas and of the stationary phase is different from 90° and has values greater than 0° and less than 180°.

An equivalent technical solution is the use of a succession of tubes arranged along the generatrices of a cylinder or along helices lying on a cylinder (coil or tubes). In that way the perturbations due to the lateral diffusion are eliminated without the necessity of increasing the speed of the carrier gas.

Figure 2:
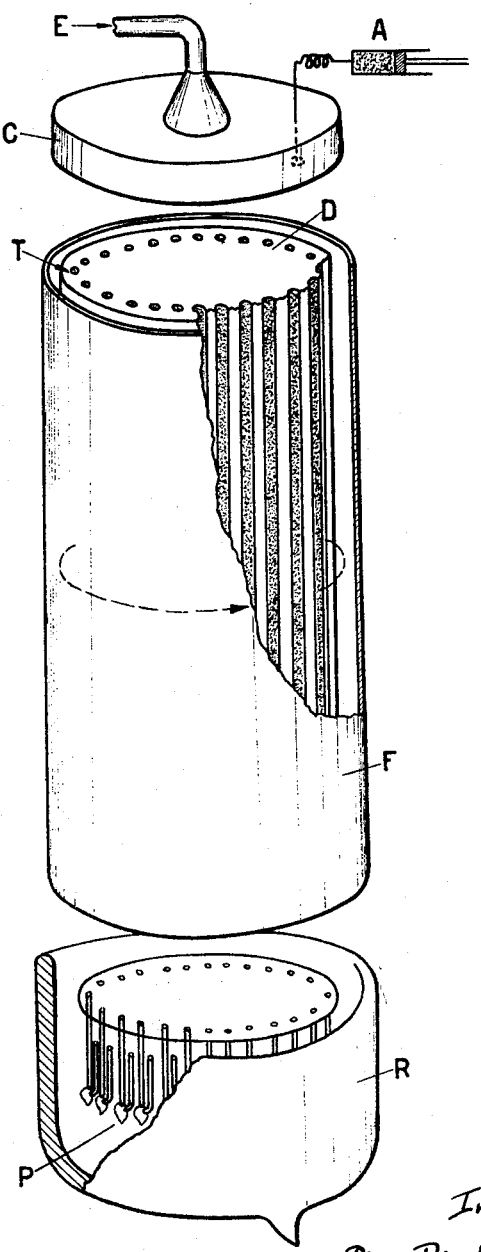
FIG. 2 is an exploded view, partly broken away illustrating apparatus built according to one embodiment of this invention for practicing the process of the invention.

FIGURE 2 shows schematically by way of example an embodiment of an apparatus for bi-dimensional gas chromatography according to the present invention.

A pipe bundle with one or more rows of chromatographic columns (100, 200 or more) rotates uniformly around its own axis, while the device for feeding the liquid or gaseous mixture to be separated and the collecting system, constituted for instance by traps immersed in a cooling bath, are fixed. The carrier gas flows axially along the pipe bundle.

In the diagram of FIGURE 2 there are indicated by A the means for feeding the mixture to be separated, by E the inlet for the carrier gas, by C the sealing cover, by T the bundle of pipes containing the stationary phase, by D a rotary metal cylinder, by F a furnace or kiln, by P the assembly containing the collecting traps and by R an insulating vessel, for instance of the Dewar type. The cover C fits over the rotary metal cylinder D. The insulating vessel R engages the cylinder F so that the collecting trap assembly P receives the gases as they leave the lower ends of the bundle of pipes T. As said above, it is also possible to keep the system of columns fixed, while rotating the feed and collector together.

The filling materials for the columns are those commonly employed in gas chromatography, namely separating liquids on inert supports, or adsorbent solids.

The mixture, which is to be separated into its components, is fed into the separating apparatus by a piston P through the piping 10, and a hole or duct in the cover C. The cylinder D is rotated by means not shown so that each separate pipe T registers with the opening or duct in the cover C for the mixture for a predetermined period. In the remainder of the revolution of the cylinder D the carrier gas, which enters the device through the duct E and the registering opening in the cap C, passes into the pipe T, so that each pipe T registers successively with the opening in the cap C through which the mixture is fed, and then has the carrier gas passed through it.

The receiving head 12, which holds the traps P is stationary, as is the cap C. There are as many traps P, as shown, as there are pipes or channels T. The traps collect the various components of the mixture as they drain from the separate pipes or channels T, as the cylinder D revolves. Thus, the mixture is separated into its constituents.

A device such as the one described can be advantageously realized with the following characteristics. The number of tubes T will vary preferably from 10 to 1000 and the length of each tube varies preferably from 0.5 to 10 meters. The length may be increased by making the tubes helical. The inner diameter of each tube varies preferably from 0.4 to 10 cm. If channels of non-circular cross-section are used, the minimum linear dimension of the cross-section of each channel is preferably not smaller than 0.2 cm. and the maximum dimension preferably not greater than 20 cm. Preferably the system of tubes or other channels will rotate with respect to the feeding and collecting members with a relative number of revolutions that may be controlled in each case and may vary between 1 and 50 revolutions per hour. A device of that kind can operate with a feeding speed greatly variable according to the mixture to be separated. If the mixture is liquid the speed may vary preferably from few cm.$^3$ up to several kg. per hour. The delivery of the carrier gas may also vary widely, preferably between 0.5 and 10 m.$^3$ an hour, and the pressure of the very gas will vary preferably from 0.1 to 10 kg./sq. cm.

Figure 3:
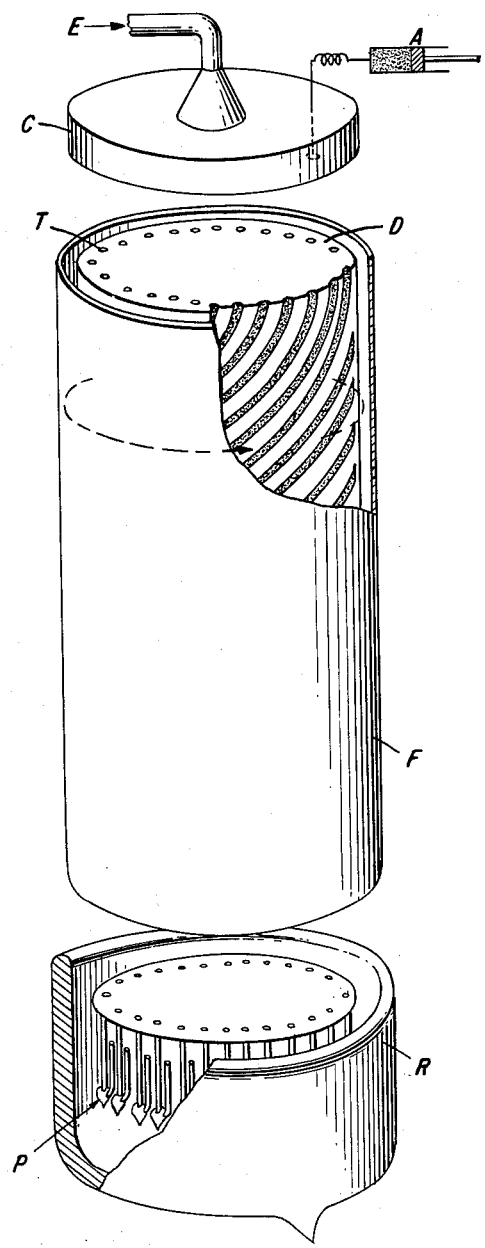
FIG. 3 is a similar view illustrating apparatus built according to another embodiment of the invention.

FIG. 3 shows an embodiment of the invention in which the tubes or pipes are helically disposed, instead of being straight and parallel as is the case in FIG. 2. The bundle of pipes in FIG. 3 is denoted at T'. Otherwise the apparatus is similar to that shown in FIG. 2 and the several parts thereof are denoted by the same reference numerals as in FIG. 2.

Devices of that kind involve many advantages over those heretofore known. They do not require elaborate systems of time programming, nor means for detecting eluted components, as necessary with apparatuses used heretofore.

It suffices to know the order of magnitude of the average boiling point of the mixture to be separated, because the apparatus, operating about at this temperature, provides at the same time a separation on the preparative scale and the analysis of said mixture.

In fact the position of a certain component, in the collecting system, permits calculating the time of retention and effecting consequently its identification. Moreover if a graph is used for reporting the quantities accumulated in each collecting element, as a function of their position, one obtains the chromatographic separation curve.

We claim:
1. A device for separating a mixture into its components by means of gas chromatography, comprising a support having therein a plurality of separate, spaced, narrow tubes, each of which contains material for the stationary phase of gas chromatography, and which are arranged annularly about a common axis and each disposed helically about said common axis, a cylindrical housing surrounding said support and spaced therefrom to provide therewith an annular space bounded at opposite sides by said support and said housing, respectively, a cover secured over one end of said support, means for feeding the mixture, which is to be separated into its components, through said cover into registry successively with one end of each of said tubes, means for feeding the carrier gas for the chromatographic process continuously and simultaneously into the corresponding ends of all said tubes except the one which at any instant registers with said feeding means, and a plurality of traps disposed at the opposite ends of the tubes for receiving and collecting the separated components of said mixture at said opposite ends of said tubes, said traps being equal in number to the number of said tubes and being spaced circularly about said common axis in corespondence with the circular spacing of said tubes, and means for effecting relative rotation about said common axis between said tubes on the one hand, and said feeding means and said traps on the other.

2. A device for separating a mixture into its components by means of gas chromatography as set forth in claim 1, wherein said support for said tubes is rotatable, and said cover and said traps are fixed.

3. A process for separating a fluid mixture into its components by means of gas chromatography, comprising feeding the mixture successively into one end of each of a plurality of separate helical passageways which are filled with the stationary phase for the gas chromatographic method and which are arranged circularly about a common axis, while rotating the passageways together about said common axis, and while feeding the carrier gas for the gas chromatographic process continuously into all said passageways at said one end thereof except for the one passageway which at any instant is the one into which the mixture is being fed, and collecting the separated components of said mixture at a plurality of closely spaced, fixed, collecting points at the other ends of said passageways, the number of collecting points being equal to the number of passageways and registering, respectively, therewith.

References Cited by the Examiner

UNITED STATES PATENTS 2,891,630 6/59 Hall et al.
3,016,106 1/62 Luft.
3,077,103 2/63 Heaton _____ 55—197 X

FOREIGN PATENTS 811,627 4/59 Great Britain.

REUBEN FRIEDMAN, Primary Examiner.

HARRY B. THORNTON, WALTER BERLOWITZ, Examiners.